(12) United States Patent
Liu et al.

(10) Patent No.: US 11,268,013 B2
(45) Date of Patent: Mar. 8, 2022

(54) INSATIABILITY EMULSIFICATION AND VISCOSITY SYSTEM WITH CONTROLLED VISCOSITY AND ITS APPLICATION IN WATER-DRIVEN RESERVOIR

(71) Applicant: Southwest Petroleum University, Sichuan (CN)

(72) Inventors: Rui Liu, Sichuan (CN); Wanfen Pu, Sichuan (CN); Daijun Du, Sichuan (CN); Lin Sun, Sichuan (CN); Shishi Pang, Sichuan (CN)

(73) Assignee: Southwest Petroleum University, Sichuan (CN)

( * ) Notice: Subject to any disclaimer, the term of this patent is extended or adjusted under 35 U.S.C. 154(b) by 0 days.

(21) Appl. No.: 16/961,562

(22) PCT Filed: Jul. 30, 2019

(86) PCT No.: PCT/CN2019/098263
§ 371 (c)(1),
(2) Date: Jul. 10, 2020

(87) PCT Pub. No.: WO2020/224064
PCT Pub. Date: Nov. 12, 2020

(65) Prior Publication Data
US 2021/0115324 A1    Apr. 22, 2021

(30) Foreign Application Priority Data
May 9, 2019    (CN) .......................... 201910384440.4

(51) Int. Cl.
*C09K 8/584*    (2006.01)
*C09K 8/588*    (2006.01)
*E21B 43/20*    (2006.01)

(52) U.S. Cl.
CPC .............. *C09K 8/584* (2013.01); *C09K 8/588* (2013.01); *E21B 43/20* (2013.01); *C09K 2208/10* (2013.01)

(58) Field of Classification Search
None
See application file for complete search history.

(56) References Cited

U.S. PATENT DOCUMENTS 5,807,810 A * 9/1998 Blezard .................... C09K 8/22
507/103
5,964,692 A * 10/1999 Blezard ................ C10M 173/02
516/59

(Continued)

FOREIGN PATENT DOCUMENTS

CN        104140790 A    11/2014
CN        106281283 A    1/2017

(Continued)

*Primary Examiner* — John J Figueroa
(74) *Attorney, Agent, or Firm* — Muncy, Geissler, Olds & Lowe, P.C.

(57) ABSTRACT

An in-situ emulsification and viscosity increase system with controllable viscosity consists of the following components in percentage by weight: 0.3~1.5% of emulsifier, 0.05~0.5% of ultrafine colloidal particles, 0.01~0.1% of suspending agent and the balance of mineralized water. The emulsifier is one of or a combination of petroleum sulfonate, petroleum carboxylate, sodium dodecyl sulfate, sodium dodecyl benzenesulfonate, alkyl glycoside, aliphatic alcohol ether carboxylate, aliphatic alcohol ether sulfonate, hydroxysulfobetaine and alkanolamide. The ultrafine colloidal particles are one of ultrafine silicon dioxide, ultrafine montmorillonoid, ultrafine ferric oxide, ultrafine ferroferric oxide, ultrafine aluminum oxide and ultrafine titanium dioxide. The suspending agent is one of partially hydrolyzed polyacrylamide, amylose, carboxymethyl chitosan, hydroxymethyl cellulose, xanthan gum and sodium alginate. The system is (Continued)

applicable to a water-flooding oil reservoir with the viscosity of lower than 50 mPa·s, has a very broad coverage scope and outstanding economic benefits and can effectively promote efficient development of water-flooding oil reservoirs.

5 Claims, 2 Drawing Sheets

(56) References Cited

U.S. PATENT DOCUMENTS

| | | | |
|---|---|---|---|
| 2011/0054042 A1* | 3/2011 | Wu | C09K 8/68 514/772.4 |
| 2015/0141302 A1* | 5/2015 | Nasr-El-Din | C09K 8/52 507/241 |
| 2015/0240145 A1* | 8/2015 | Newman | C09K 8/58 507/100 |
| 2016/0115376 A1* | 4/2016 | Nasr-El-Din | C09K 8/72 507/241 |
| 2017/0015896 A1* | 1/2017 | Cox | C09K 8/50 |

FOREIGN PATENT DOCUMENTS

| | | |
|---|---|---|
| CN | 106833591 A | 6/2017 |
| WO | WO-2014039467 A1 | 3/2014 |

* cited by examiner ized emulsions. Therefore, emulsions that are stable to a solid phase were called Pickering emulsions. Compared with traditional emulsions, the distinctive features of Pickering emulsions were irreversible interfacial adsorption, strong anti-coalescence stability, super stability for giant emulsions (up to several millimeters), a high concentration of internal phase and irregular rheological characteristics. The size of the emulsion was directly related to the size of the solid particles. Colloidal clay promoted the formation of an O/W or W/O emulsion. Paraffin, silicon dioxide, clay, iron oxide and polymer colloids were stabilized at the interface to stabilize the emulsion. An interfacial film was stabilized through the network of particles or colloids adsorbed at the interface. These were affected by the size, shape, morphology, density, concentration, surface coverage and wettability of the particles. Masalova et al. used polyhedral oligomeric silsesquioxane POSSAM0275 to form a highly concentrated water-in-oil emulsion (Masalova, I., Tshilumbu, N., Mamedov, E., Kharatyan, E., Katende, J. Stabilisation of highly concentrated water-in-oil emulsions by polyhedral oligomeric silsesquioxane nanomolecules [J]. Journal of Molecular Liquids, 2019, 279, 351-360), wherein the concentration of a dispersed phase was approximately 90% and the oil phase was dodecane. POSSAM0275 nanomolecules can form a brand new interface layer in the emulsion. This interface layer was different from traditional surfactants and has the properties different from those of nanoparticles in an oil-water interface layer.

INSATIABILITY EMULSIFICATION AND VISCOSITY SYSTEM WITH CONTROLLED VISCOSITY AND ITS APPLICATION IN WATER-DRIVEN RESERVOIR

TECHNICAL FIELD

The present invention relates to an in-situ emulsification and viscosity increase system with controllable viscosity and an application thereof in water-flooding oil reservoirs, belonging to the technical field of oilfield chemistry and oilfield exploitation.

BACKGROUND ART

An oil reservoir developed by water injection is affected by heterogeneity. When the water-flooding sweep degree in a high-permeability area is high, the remaining oil saturation is low; and when the water-flooding sweep degree in a low-permeability area is low, the remaining oil saturation is high (Liu R, Du D, Pu W, et al. Enhanced oil recovery potential of alkyl alcohol polyoxyethylene ether sulfonate surfactants in high-temperature and high-salinity reservoirs [J]. Energy & Fuels, 2018, 32:12128-12140). The type of a water-flooding oil reservoir emulsion is closely related to the water content, and an oil-external emulsion is easily formed under a low water content condition; and a water-external emulsion is easily formed under a high water-content condition. Based on the phase-volume ratio theory of uniform emulsion particle size, it is believed that when an internal phase volume fraction reaches a maximum accumulation fraction of spherical particles, the emulsion will undergo a catastrophic phase inversion (Galindo-Alvarez J, Sadtler V, Choplin L, Salager J L. Viscous oil emulsification by catastrophic phase inversion: influence of oil viscosity and process conditions[J]. Industrial & Engineering Chemistry Research, 2011, 50(9):5575-5583), and the viscosity of the emulsion subjected to catastrophic phase inversion will change significantly.

The viscosity of an emulsion is closely related to the type of the emulsion. Therefore, scholars at home and abroad have carried out extensive research and formed a variety of determination methods, such as a Winsor ratio R value, a hydrophile-lipophile balance value HLB, and a hydrophile-lipophile deviation value HLD. Winsor ratio is mainly used to judge the hydrophilicity and lipophilicity of (natural) emulsifiers. Based on the relative relationship between R and 1, the emulsion system is generally divided into four categories. When R<1, the reaction energy between an emulsifier and an oil phase is smaller than the reaction energy of a water phase, an O/W type emulsion (type I) is easily formed. When R>1, the reaction energy between the emulsifier and the water phase is smaller than the reaction energy of the oil phase, a W/O type emulsion (type II) is easily formed. When R≈1, it is possible to form a system with an organic phase in the upper part, a water phase in the lower part, and a microemulsion in the middle (type III); and it is also possible to form a single-phase homogeneous system in which oil and water exist as a bicontinuous phase or a layered phase. The hydrophile-lipophile deviation value is a numerical expression of a deviation of the optimized formula. The HLD value is similar to the concept of the HLB value, but also takes into account possible changes in the emulsifier itself and the system. According to the definition of the HLD value, when HLD=0 is the point of the optimal formula, the free energy required for the emulsifier to transfer from an oil phase to a water phase is 0 under this condition. When HLD=0, the interfacial tension of the system is at the lowest value and the spontaneous curvature of the system is 0. Any change in the properties of the system, such as temperature, type of emulsifier, properties of crude oil, presence of salts or co-emulsifiers, will cause the system to deviate from optimal values.

In 1903, Ramsden discovered that colloidal-scale solid particles could stabilize emulsions. In 1907, Pickering carried out independent system work on solid phase ion stabi- However, the bulk density of an internal phase of an oil-external emulsion near a phase change point reached its limit (Shi Shenglong, Wang Yefei, Wang Lushan, Jin Yanxin, Wang Tao, Wang Jing. Spontaneous Emulsification Flooding of High-temperature and High-salt oil reservoirs in Shengtuo Oilfield to Increase Oil Recovery Rate [J]. Oilfield Chemistry, 2015, 32(2):242-246), the average median particle size of the emulsion is the largest, and the viscosity of the oil-external emulsion is several to ten times that of crude oil. Kumar, et al. (Kumar R, Dao E, Mohanty K. Heavy-oil recovery by in-situ emulsion formation[J]. SPE Journal, 2012, 17(02):326-334), Alboudwarej et al. (Alboudwarej H, Muhammad M, Shahraki A K, Dubey S, Vreenegoor L, Saleh J M. Rheology of heavy-oil emulsions[J]. SPE Production & Operations, 2007, 22(03):285-293), Tyrode, et al. (Tyrode E, Allouche J, Choplin L, Salager J. Emulsion catastrophic inversion from abnormal to normal morphology. 4. Following the emulsion viscosity during three inversion protocols and extending the critical dispersed-phase concept[J]. Industrial & engineering chemistry research, 2005, 44(1):67-74) studied emulsions of light oil, ordinary heavy oil, and extra-heavy oil, and consistently found that the viscosity of an emulsion near the phase change point can reach several times the viscosity of crude oil. However, the emulsion with excessive viscosity is difficult to spread in a formation, resulting in excessive injection pressure, which seriously affects the production. On the other hand, field practice has shown that the formation of a low-viscosity water-external emulsion in a high-permeability layer and the formation of a high-viscosity oil-external emulsion in a low-permeability layer tend to increase the heterogeneity of a reservoir. Therefore, the important premise for the emulsion to greatly increase the recovery rate is the controllable viscosity in the reservoir. That is, a high-viscosity emulsion is formed in a high water-content layer, which increases the percolation resistance; and a low-viscosity emulsion is formed in a low-permeability layer, which reduces the heterogeneity of the reservoir to increase the sweep coefficients of medium- and low-permeability layers.

SUMMARY OF THE INVENTION

Technical Problem

An object of the present invention is to provide an in-situ emulsification and viscosity increase system with controllable viscosity. This system has excellent fluidity self-control performance, cheap and easily available raw materials, reliable preparation principle and outstanding economic benefits, can achieve piston displacement in a high-permeability area (high water content, low oil saturation) and in a low-permeability area (low water content, high oil saturation) and greatly improve the recovery rate of water-flooding oil reservoirs, and has a broad industrial application prospect.

Another object of the present invention is to provide an application of the in-situ emulsification and viscosity increase system with controllable viscosity to water-flooding oil reservoirs with a viscosity of lower than 50 mPa·s, is not affected by temperatures and mineralization degrees of the oil reservoirs, has a very broad coverage scope of oil reservoirs and outstanding economic benefits, and can effectively promote efficient development of water-flooding oil reservoirs.

Solutions of Problems

Technical Solutions

To fulfill the above technical objects, the present invention adopts the following technical solutions.

An in-situ emulsification and viscosity increase system with controllable viscosity consists of emulsifier+ultrafine colloidal particles+suspending agent. This system is directly dissolved or dispersed with water and pumped into a formation through injection equipment, and has a viscosity slightly higher than the viscosity of a water phase. In an oil reservoir having a water content of 20~90%, a synergistic effect occurs between the emulsifier and the ultrafine colloidal particles. Remaining (residual) oil is emulsified in situ to form a kinetically stable water-external emulsion. Under a high water-content condition (60~80%), the viscosity of the emulsion is 1~1.5 times the viscosity of crude oil. Under a low water-content condition (<60%), the viscosity of the emulsion is slightly lower than the viscosity of the crude oil and significantly greater than the viscosity of a water phase. Therefore, piston displacement in a high-permeability area and a low-permeability area is achieved, and in cooperation with oil washing under an ultra-low interfacial tension, the oil recovery rate in water-flooding oil reservoirs with a crude oil viscosity less than 50 mPa·s in oil reservoir conditions is greatly increased.

The in-situ emulsification and viscosity increase system with controllable viscosity includes an emulsifier, lipophilic colloidal particles and a carrying agent that form (ultra) low interfacial tension (an order of magnitude of $10^{-2}$ mN/m and below) with crude oil. The system consists of the following components in percentage by weight:

0.3~1.5% of emulsifier;
0.05~0.5% of ultrafine colloidal particles;
0.01~0.1% of suspending agent; and
the balance of mineralized water.

The emulsifier is one of or a combination of petroleum sulfonate, petroleum carboxylate, sodium dodecyl sulfonate, sodium dodecyl benzenesulfonate, alkyl glycoside, fatty alcohol ether carboxylate, fatty alcohol ether sulfonate, hydroxysulfobetaine and alkanolamide, and has an oil-water interfacial tension of the order of magnitude of $10^{-2}$ mN/m and below.

The ultrafine colloidal particles are made of one of ultrafine silica, ultrafine montmorillonoid, ultrafine ferric oxide, ultrafine ferroferric oxide, ultrafine aluminum oxide and ultrafine titanium dioxide. Here, the "ultrafine" means that the particle size of the colloidal particles is 10 nm~1.0 μm.

The suspending agent is one of partially hydrolyzed polyacrylamide, amylose, carboxymethyl chitosan, hydroxymethyl cellulose, xanthan gum and sodium alginate.

The above substances are all commercially available.

In the in-situ emulsification and viscosity increase system with controllable viscosity, in percentage by weight, the emulsifier is preferably 0.4%, the ultrafine colloidal particles are preferably 0.15%, the suspending agent is preferably 0.05%, and the balance is mineralized water.

An application of the in-situ emulsification and viscosity increase system with controllable viscosity in water-flooding oil reservoirs is also provided. The properties of the oil reservoir are as follows:

the oil reservoir is a water-flooding oil reservoir in which the temperature is up to 140° C., the mineralization degree of water is up to $24 \times 10^4$ mg/L, and the viscosity of formation crude oil is less than 50 mPa·s.

The in-situ emulsification and viscosity increase system with controllable viscosity provided by the present invention is directly dissolved or dispersed with mineralized water, and has a viscosity slightly higher than the viscosity of the mineralized water, and a good injection property. Under a condition of water content of 20~90%, this system and crude oil generate a kinetically stable water-external emulsion in situ. Under a high water-content condition (60~80%), the viscosity of the emulsion is 1~1.5 times the viscosity of the crude oil, while under a low water-content condition (<60%), the viscosity of the emulsion is slightly lower than the viscosity of the crude oil and is significantly greater than the viscosity of the water phase, which reflects the self-controlling performance of fluidity: a high-viscosity water-external emulsion is formed in the high-permeability area to improve the percolation resistance, while a low-viscosity water-external emulsion is formed in the low-permeability area to reduce the displacement resistance, thereby achieving efficient displacement in high-permeability and low-permeability areas, and greatly improving the recovery rate of water-flooding oil reservoirs.

The viscosity self-control mechanism of the in-situ emulsification and viscosity increase system is as follows: ① both the suspending agent and the ultrafine colloidal particles in a water-external phase increase the viscosity of a water phase; ② the interfacial tension between the in-situ emulsification and viscosity increase system and crude oil reaches the order of magnitude of $10^{-2}$ mN/m and below, which promotes the Gibbs free energy of the emulsifier system adsorbed at an oil-water interface to be very low, resulting in easy formation of a water-external emulsion; ③ the emulsifier is adsorbed on the surfaces of the ultrafine colloidal particles to form a large-scale emulsification complex, thereby achieving accumulation of the small-scale water-external emulsion formed by the emulsifier and the crude oil and the large-scale water-external emulsion formed by the emulsifier+ultrafine colloidal particles and the crude oil in a three-dimensional space. The in-situ emulsification and viscosity increase system controls the viscosity of the emulsion through the above-mentioned mechanism, and achieves efficient displacement in a high-permeability area (high water content, low oil saturation) and a low-permeability area (low water content, high oil saturation).

Beneficial Effects of Invention

Beneficial Effects

Compared with the prior art, the present invention has the following beneficial effects:

(1) the in-situ emulsification and viscosity increase system with controllable viscosity is directly dissolved or dispersed with the mineralized water, is not affected by the mineralization degree of the mineralized water, has a good injection property, and can reside deep in oil reservoirs;

(2) the interfacial tension between the in-situ emulsification and viscosity increase system with controllable viscosity and crude oil is up to the order of magnitude of 10−2 mN/m and below;

(3) under a condition of water content of 20~90%, this system and the crude oil generate a kinetically stable water-external emulsion under shear induction; under a high water-content condition (60~80%), the viscosity of the emulsion is appropriately higher than the viscosity of the crude oil, while under a low water-content condition (<60%), the viscosity of the emulsion is slightly lower than the viscosity of the crude oil and significantly greater than the viscosity of the water phase, which reflects the self-controlling performance of fluidity;

(4) the present invention is suitable for water-flooding oil reservoirs with a viscosity of less than 50 mPa·s, and the coverage for the oil reservoirs is very wide; and all raw materials are purchased from the market, and the economic benefits are outstanding, the recovery rate of water-flooding oil reservoirs can be increased significantly, and the application prospect is particularly broad.

BRIEF DESCRIPTION OF THE DRAWINGS

Description of Drawings

Figure 1:
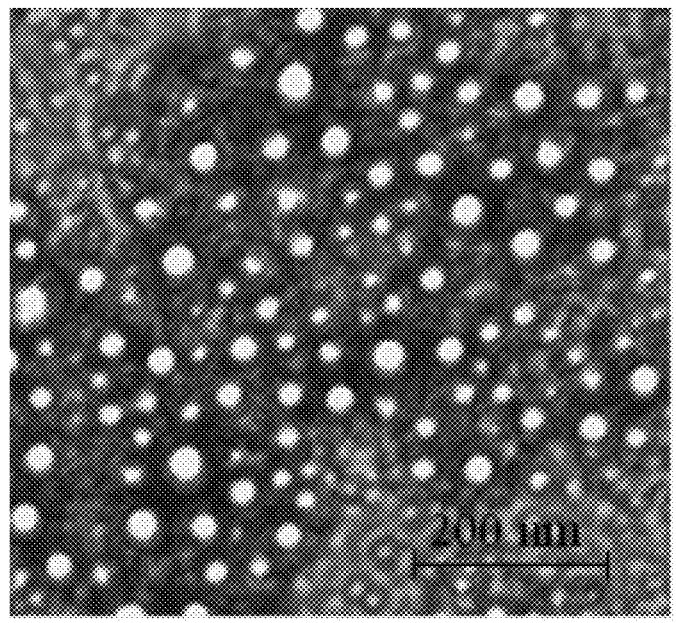

FIG. 1 is a micrograph of an in-situ emulsification and viscosity increase system with controllable viscosity.

Figure 2:
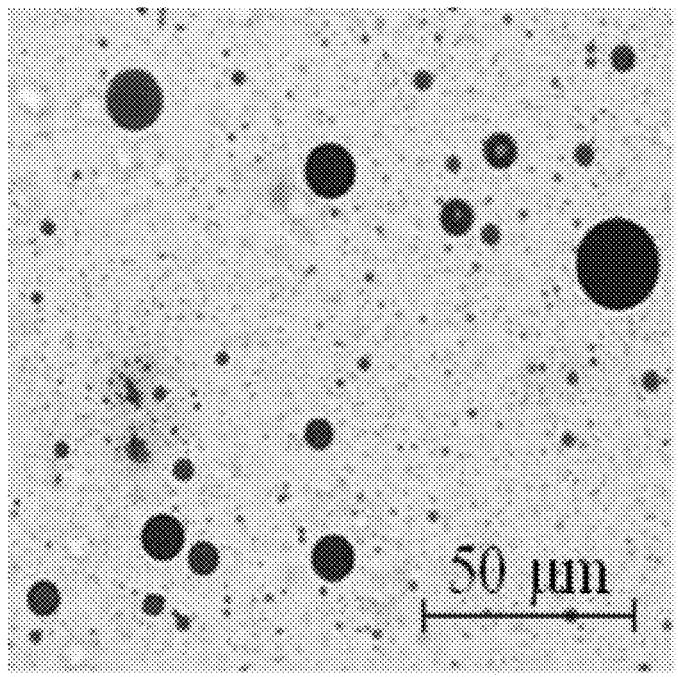

FIG. 2 is a micrograph of an emulsion formed by the in-situ emulsification and viscosity increase system with controllable viscosity.

Figure 3:
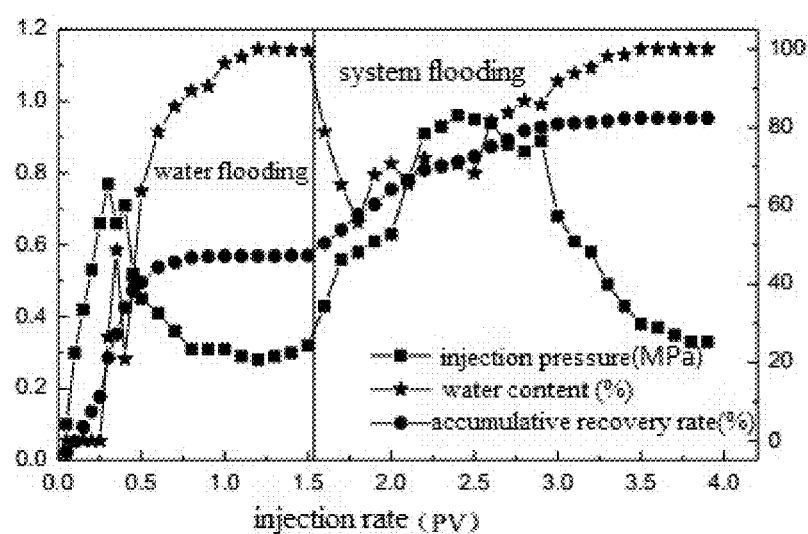

FIG. 3 is a diagram showing an oil displacement effect of an in-situ emulsification and viscosity increase system with controllable viscosity.

EMBODIMENT OS INVENTION

Detailed Description

The present invention is further described below with reference to the accompanying drawings and examples, for those skilled in the art to understand the present invention. However, it should be clear that the present invention is not limited to the scope of the specific embodiments. To those of ordinary skill in the art, as long as various changes are within the spirit and scope of the present invention as defined and determined by the appended claims, they are all protected.

Unless otherwise indicated, all technical and scientific terms used herein have the same meanings as commonly understood by those of ordinary skill in the art to which this application belongs.

The preparation of an in-situ emulsification and viscosity increase system with controllable viscosity includes the following steps: preparing 99.4% of mineralized water with a mineralization degree of 0.5~24×10$^4$ mg/L in percentage by weight; stirring for 0.5~2 h to ensure sufficient solving and uniform mixing; adding 0.4% of emulsifier, 0.15% of ultrafine colloidal particles, and 0.05% of suspending agent to the prepared mineralized water in sequence, and stirring for 0.5~3 h to ensure that various components are sufficiently solved and uniformly mixed, thereby completing the preparation of the in-situ emulsification and viscosity increase system with controllable viscosity.

Embodiment 1 Oil-Water Interfacial Tension of In-Situ Emulsification and Viscosity Increase System with Controllable Viscosity Mineralized water 1# with a mineralization degree of 0.5×10$^4$ mg/L (the concentration of $Ca^{2+}$ and $Mg^{2+}$ is 0.01×10$^4$ mg/L), mineralized water 2# with a mineralization degree of 3×10$^4$ mg/L (the concentration of $Ca^{2+}$ and $Mg^{2+}$ is 0.1×10$^4$ mg/L), mineralized water 3# with a mineralization degree of 5×10$^4$ mg/L (the concentration of $Ca^{2+}$ and $Mg^{2+}$ is 0.5×10$^4$ mg/L), mineralized water 4# with a mineralization degree of 10×10$^4$ mg/L (the concentration of $Ca^{2+}$ and $Mg^{2+}$ is 1.0×10$^4$ mg/L), and mineralized water 5# with a mineralization degree of 24×10$^4$ mg/L (the concentration of $Ca^{2+}$ and $Mg^{2+}$ is 1.5×10$^4$ mg/L) are prepared respectively, and stirred for 1 h. 0.2% of sodium petroleum sulfonate, 0.2% of sodium dodecyl sulfonate, 0.15% of ultrafine silicon dioxide, and 0.05% of partially hydrolyzed polyacrylamide are added to 1# in sequence; 0.2% of sodium fatty alcohol ether carboxylate, 0.2% of sodium dodecyl benzenesulfonate, 0.15% of ultrafine montmorillonite, and 0.05% of hydroxymethyl cellulose are added to 2# in sequence; 0.4% of dodecyl hydroxysulfobetaine, 0.15% of ultrafine iron oxide, and 0.05% of xanthan gum are added to 3# in sequence; 0.4% of alkanolamide, 0.15% of ultrafine ferric oxide, and 0.05% of sodium sodium alginateate are added into 4# in sequence; 0.4% of C12/C14 alkyl glycoside, 0.15% of ultrafine titanium dioxide, and 0.05% of carboxymethyl chitosan are added into 5# in sequence; the mixture is stirred for 1.5 h to obtain the in-situ emulsification and viscosity increase system with controllable viscosity.

The interfacial tensions between the in-situ emulsification and viscosity increase system with controllable viscosity and two kinds of degassed crude oils (the viscosities are 10.3 mPa·s, and 21.2 mPa·s at 80° C., respectively) are measured with a TX500C spinning drop interfacial tensiometer at 80° C. for 2 h, to obtain a stable interfacial tension value. Under the condition of 0.5~24×10$^4$ mg/L mineralized water, the system can keep the interfacial tension of oil and water at the order of magnitude of 10$^{-2}$ mN/m, which shows an excellent oil washing performance. The results are shown in Table 1.

TABLE 1

Stable interfacial tension between in-situ emulsification system with controllable viscosity and crude oil

| Mineralization degree (014 mg/L) | Crude oil viscosity (mPa · s) | Oil-water interfacial tension (mN/m) |
|---|---|---|
| 0.5 | 10.3 | 0.0031 |
|  | 21.2 | 0.0045 |
| 3 | 10.3 | 0.038 |
|  | 21.2 | 0.0036 |
| 5 | 10.3 | 0.075 |
|  | 21.2 | 0.0084 |
| 10 | 10.3 | 0.032 |
|  | 21.2 | 0.049 |
| 24 | 10.3 | 0.056 |
|  | 21.2 | 0.0052 |

TABLE 2

Apparent viscosity of controllable in-situ emulsification and viscosity increase system (90° C.)

| Mineralization degree ($10^4$ mg/L) | Apparent viscosity of system (mPa · s) |
|---|---|
| 0.5 | 1.89 |
| 3 | 2.52 |
| 5 | 4.69 |
| 10 | 3.14 |
| 24 | 1.26 |

Embodiment 2 Apparent Viscosity of In-Situ Emulsification and Viscosity Increase System with Controllable Viscosity Mineralized water 1# with a mineralization degree of $0.5 \times 10^4$ mg/L (the concentration of $Ca^{2+}$ and $Mg^{2+}$ is $0.01 \times 10^4$ mg/L), mineralized water 2# with a mineralization degree of $3 \times 10^4$ mg/L (the concentration of $Ca^{2+}$ and $Mg^{2+}$ is $0.1 \times 10^4$ mg/L), mineralized water 3# with a mineralization degree of $5 \times 10^4$ mg/L (the concentration of $Ca^{2+}$ and $Mg^{2+}$ is $0.5 \times 10^4$ mg/L), mineralized water 4# with a mineralization degree of $10 \times 10^4$ mg/L (the concentration of $Ca^{2+}$ and $Mg^{2+}$ is $1.0 \times 10^4$ mg/L), and mineralized water 5# with a mineralization degree of $24 \times 10^4$ mg/L (the concentration of $Ca^{2+}$ and $Mg^{2+}$ is $1.5 \times 10^4$ mg/L) are prepared respectively, and stirred for 1 h. 0.2% of sodium fatty alcohol ether carboxylate, 0.2% of sodium dodecyl sulfonate, 0.15% of ultrafine montmorillonite, and 0.05% of amylose are added to 1# in sequence; 0.2% of sodium fatty alcohol ether sulfonate, 0.2% of sodium dodecyl benzenesulfonate, 0.15% of ultrafine ferric oxide, and 0.05% of sodium sodium alginateate are added to 2# in sequence; 0.4% of alkanolamide, 0.15% of ultrafine iron oxide, and 0.05% of hydroxymethyl cellulose are added to 3# in sequence; 0.4% of dodecyl hydroxysulfobetaine, 0.15% of ultrafine titanium dioxide, and 0.05% of xanthan gum are added into 4# in sequence; 0.2% of C12/C14 alkyl glycoside, 0.2% of alkanolamide, 0.15% of ultrafine silicon dioxide, and 0.05% of carboxymethyl chitosan are added into 5# in sequence; the mixture is stirred for 1.5 h to obtain the in-situ emulsification and viscosity increase system with controllable viscosity.

The solution of 5# is observed with an optical microscope, and it can be seen that ultrafine colloidal particles are uniformly dispersed in a liquid phase, as shown in FIG. 1. The apparent viscosity of the in-situ emulsification and viscosity increase system with controllable viscosity is tested with a high-temperature and high-pressure Hack rheometer (a shear rate of 7.34 $s^{-1}$) at 90° C.; the viscosity of $0.5 \sim 24 \times 10^4$ mg/L mineralized water at 90° C. is 0.3~0.8 mPa·s; the apparent viscosity of the in-situ emulsification and viscosity increase system with controllable viscosity is 1.2~5.0 mPa·s under the condition of $0.5 \sim 24 \times 10^4$ mg/L mineralized water (see Table 2). The results show that the in-situ emulsification and viscosity increase system with controllable viscosity has a good injection property in a formation.

Embodiment 3 Viscosity of Emulsion Formed by In-Situ Emulsification and Viscosity Increase System with Controllable Viscosity and Crude Oil Mineralized water 1# with a mineralization degree of $0.5 \times 10^4$ mg/L (the concentration of $Ca^{2+}$ and $Mg^{2+}$ is $0.01 \times 10^4$ mg/L), mineralized water 2# with a mineralization degree of $3 \times 10^4$ mg/L (the concentration of $Ca^{2+}$ and $Mg^{2+}$ is $0.1 \times 10^4$ mg/L), mineralized water 3# with a mineralization degree of $5 \times 10^4$ mg/L (the concentration of $Ca^{2+}$ and $Mg^{2+}$ is $0.5 \times 10^4$ mg/L), mineralized water 4# with a mineralization degree of $10 \times 10^4$ mg/L (the concentration of $Ca^{2+}$ and $Mg^{2+}$ is $1.0 \times 10^4$ mg/L), and mineralized water 5# with a mineralization degree of $24 \times 10^4$ mg/L (the concentration of $Ca^{2+}$ and $Mg^{2+}$ is $1.5 \times 10^4$ mg/L) are prepared respectively, and stirred for 1 h. 0.4% of sodium petroleum carboxylate, 0.15% of ultrafine montmorillonite, and 0.05% of amylose are added to 1# in sequence; 0.4% of sodium fatty alcohol ether sulfonate, 0.15% of ultrafine silicon dioxide, and 0.05% of hydroxymethyl cellulose are added to 2# in sequence; 0.4% of dodecyl hydroxysulfobetaine, 0.15% of ultrafine iron oxide, and 0.05% of sodium sodium alginateate are added to 3# in sequence; 0.4% of alkanolamide, 0.15% of ultrafine titanium dioxide, and 0.05% of xanthan gum are added into 4# in sequence; 0.4% of C12/C14 alkyl glycoside, 0.15% of ultrafine ferroferric oxide, and 0.05% of carboxymethyl chitosan are added into 5# in sequence; the mixture is stirred for 1.5 h to obtain the in-situ emulsification and viscosity increase system with controllable viscosity.

The in-situ emulsification and viscosity increase system with controllable viscosity and the crude oil are prepared at a ratio of 2:8, 3:7, 4:6, 5:5, 6:4, 7:3, 8:2, and 9:1 (the water contents are 20%, 30%, 40%, 50%, 60%, 70%, 80%, and 90% in sequence), sealed and placed in an oil bath pan with a magnetic stirring device; and stirred for 1 h at an oil bath condition of 90° C. while observing the emulsification. After the stirring is completed, the temperature condition of the oil reservoir is simulated with a high-temperature and high-pressure Hack rheometer to test the emulsion and the crude oil, see Tables 3~5.

Under the oil reservoir temperature condition (45~120° C.), the viscosity of the mineralized water is 0.36~0.82 mPa·s, and a difference in the fluidity of water and oil exhibits great. Under a condition of water content of 20 to 90%, this in-situ emulsification and viscosity increase system with controllable viscosity and crude oil generate a kinetically stable aqueous-external emulsion under shear induction. Under a high water-content condition (60~80%), the viscosity of the emulsion is 1~1.5 times of the viscosity of the crude oil, while under a low water-content condition (<60%), the viscosity of the emulsion is slightly lower than the viscosity of the crude oil and significantly greater than the viscosity of a water phase, which reflects the self-controlling performance of fluidity. Colloidal particles and emulsifier molecule-stabilized emulsion droplets are relatively large, while emulsifier-stabilized emulsion droplets are relatively small. These two types of droplets coexist to create a dense and stable spatial accumulation. The particle size of the emulsion with a mineralization degree of $5\times10^4$ mg/L (the concentration of $Ca^{2+}$ and $Mg^{2+}$ is $0.5\times10^4$ mg/L) and a water content of 80% after 10 times of dilution is shown in FIG. 2. The large-scale and small-size emulsions can exist in a kinetically stable form.

TABLE 3

Viscosity of emulsions with different water-oil ratios under the condition of water mineralization degree of $0.5 \times 10^4$ mg/L

| Oil-water ratio | Viscosity (mPa · s) |
|---|---|
| 2:8 | 4.16 |
| 3:7 | 5.58 |
| 4:6 | 4.73 |
| 5:5 | 6.98 |
| 6:4 | 10.61 |
| 7:3 | 13.65 |
| 8:2 | 11.21 |
| 9:1 | 5.74 |

Test temperature: 80° C.
Viscosity of crude oil: 10.3 mPa · s
Viscosity of mineralized water: 0.53 mPa · s

TABLE 4

Viscosity of emulsions with different water-oil ratios under the condition of water mineralization degree of $3 \times 10^4$ mg/L

| Water-oil ratio | Viscosity (mPa · s) |
|---|---|
| 2:8 | 3.51 |
| 3:7 | 4.63 |
| 4:6 | 5.12 |
| 5:5 | 3.15 |
| 6:4 | 8.52 |
| 7:3 | 10.03 |
| 8:2 | 8.19 |
| 9:1 | 6.12 |

Test temperature: 45° C.
Viscosity of crude oil: 7.8 mPa · s
Viscosity of mineralized water: 0.82 mPa · s

TABLE 5

Viscosity of emulsions with different water-oil ratios under the condition of water mineralization degree of $5 \times 10^4$ mg/L

| Water-oil ratio | Viscosity (mPa · s) |
|---|---|
| 2:8 | 3.25 |
| 3:7 | 6.87 |
| 4:6 | 8.23 |
| 5:5 | 13.68 |
| 6:4 | 18.73 |
| 7:3 | 21.31 |
| 8:2 | 16.19 |
| 9:1 | 10.56 |

Test temperature: 90° C.
Viscosity of crude oil: 15.6 mPa · s
Viscosity of mineralized water: 0.49 mPa · s

TABLE 6

Viscosity of emulsions with different water-oil ratios under the condition of water mineralization degree of $10 \times 10^4$ mg/L

| Water-oil ratio | Viscosity (mPa · s) |
|---|---|
| 2:8 | 12.56 |
| 3:7 | 15.21 |
| 4:6 | 20.56 |
| 5:5 | 22.35 |
| 6:4 | 30.69 |
| 7:3 | 35.45 |
| 8:2 | 32.26 |
| 9:1 | 19.51 |

Test temperature: 104° C.
Viscosity of crude oil: 28.1 mPa · s
Viscosity of mineralized water: 0.42 mPa · s

TABLE 7

Viscosity of emulsions with different oil-water ratios under the condition of water mineralization degree of $24 \times 10^4$ mg/L

| Water-oil ratio | Viscosity (mPa · s) |
|---|---|
| 2:8 | 1.51 |
| 3:7 | 3.54 |
| 4:6 | 2.69 |
| 5:5 | 4.18 |
| 6.4 | 5.67 |
| 7:3 | 3.32 |
| 8:2 | 6.56 |
| 9:1 | 4.23 |

Test temperature: 140° C.
Viscosity of crude oil: 4.8 mPa · s
Viscosity of mineralized water: 0.36 mPa · s Embodiment 4 Enhanced Oil Recovery Performance of In-Situ Emulsification and Viscosity Increase System with Controllable Viscosity Mineralized water 3# with a mineralization degree of $5\times10^4$ mg/L (the concentration of $Ca^{2+}$ and $Mg^{2+}$ is $0.5\times10^4$ mg/L), and mineralized water 5# with a mineralization degree of $24\times10^4$ mg/L (the concentration of $Ca^{2+}$ and $Mg^{2+}$ is $1.5\times10^4$ mg/L) are prepared respectively, and stirred for 1 h. 0.4% of dodecyl hydroxysulfobetaine, 0.15% of ultrafine iron oxide, and 0.05% of hydroxymethyl cellulose are added into 3# in sequence; 0.2% of C12/C14 alkyl glycoside, 0.2% of alkanolamide, 0.15% of ultrafine silicon dioxide, and 0.05% of carboxymethyl chitosan are added into 5# in sequence; the mixture is stirred for 1.5 h to obtain the in-situ emulsification and viscosity increase system with controllable viscosity.

Two artificial simulated cores (45×45×300 mm long cores, with an average porosity of 20% and an average gas permeability of 300 mD) are prepared under the conditions that the temperature is 90° C., the viscosity of crude oil is 15.6 mPa·s, and the average original oil saturation is 75%. In the water flooding stage (a water flooding speed of 1.5 mL/min), affected by an unfavorable water-oil fluidity ratio, the crude oil produced by water flooding has a low degree of recovery, with a crude oil recovery rate of about 48% under a water content of 98%. Subsequently, the in-situ emulsification and viscosity increase system (the viscosity of the in-situ emulsification and viscosity increase system at 90° C. is 1.2~5.0 mPa·s, and an injection rate is 1.5 mL/min) is injected. During the injection of the system, the injection pressure increases and the water content decreases. Oil is produced again. An obvious water-external emulsion is observed at the outlet end of each core. It is demonstrated that the in-situ emulsification and viscosity increase system and crude oil are emulsified in situ, which significantly improves the fluidity of a displacement medium. At the same time, a Jamin effect of the emulsion improves the heterogeneity of the cores and enhances the sweep volume of displacement fluid, thereby significantly increasing the crude oil recovery ratio by about 33%, and the cumulative recovery ratio is over 80%.

The displacement effect of the in-situ emulsification and viscosity increase system at at ultra-high mineralization degree ($24 \times 10^4$ mg/L, in which the concentration of $Ca^{2+}$ and $Mg^{2+}$ is $1.5 \times 10^4$ mg/L) at high temperature (90° C.) is shown in FIG. 3.

The invention claimed is:

1. An in-situ emulsification and viscosity increase system with controllable viscosity, comprising:
an emulsifier,
lipophilic colloidal particles and
a carrying agent that form ultra-low interfacial tension with crude oil, wherein the ultra-low interfacial tension is in an order of magnitude of $10^{-2}$ mN/m and below;
the system consisting of the following components in percentage by weight:
0.3~1.5% of emulsifier;
0.05~0.5% of ultrafine colloidal particles;
0.01~0.1% of suspending agent; and
a balance of mineralized water.

2. The in-situ emulsification and viscosity increase system with controllable viscosity according to claim 1, wherein the emulsifier is one of or a combination of petroleum sulfonate, petroleum carboxylate, sodium dodecyl sulfate, sodium dodecyl benzenesulfonate, alkyl glycoside, aliphatic alcohol ether carboxylate, aliphatic alcohol ether sulfonate, hydroxysulfobetaine and alkanolamide.

3. The in-situ emulsification and viscosity increase system with controllable viscosity according to claim 1, wherein the ultrafine colloidal particles are one of ultrafine silicon dioxide, ultrafine montmorillonoid, ultrafine ferric oxide, ultrafine ferroferric oxide, ultrafine aluminum oxide and ultrafine titanium dioxide.

4. The in-situ emulsification and viscosity increase system with controllable viscosity according to claim 3, wherein the ultrafine colloidal particles have a particle size of 10 nm-1.0 μm.

5. The in-situ emulsification and viscosity increase system with controllable viscosity according to claim 1, wherein the suspending agent is one of partially hydrolyzed polyacrylamide, amylose, carboxymethyl chitosan, hydroxymethyl cellulose, xanthan gum and sodium alginate.

* * * * *